Patented Feb. 4, 1947

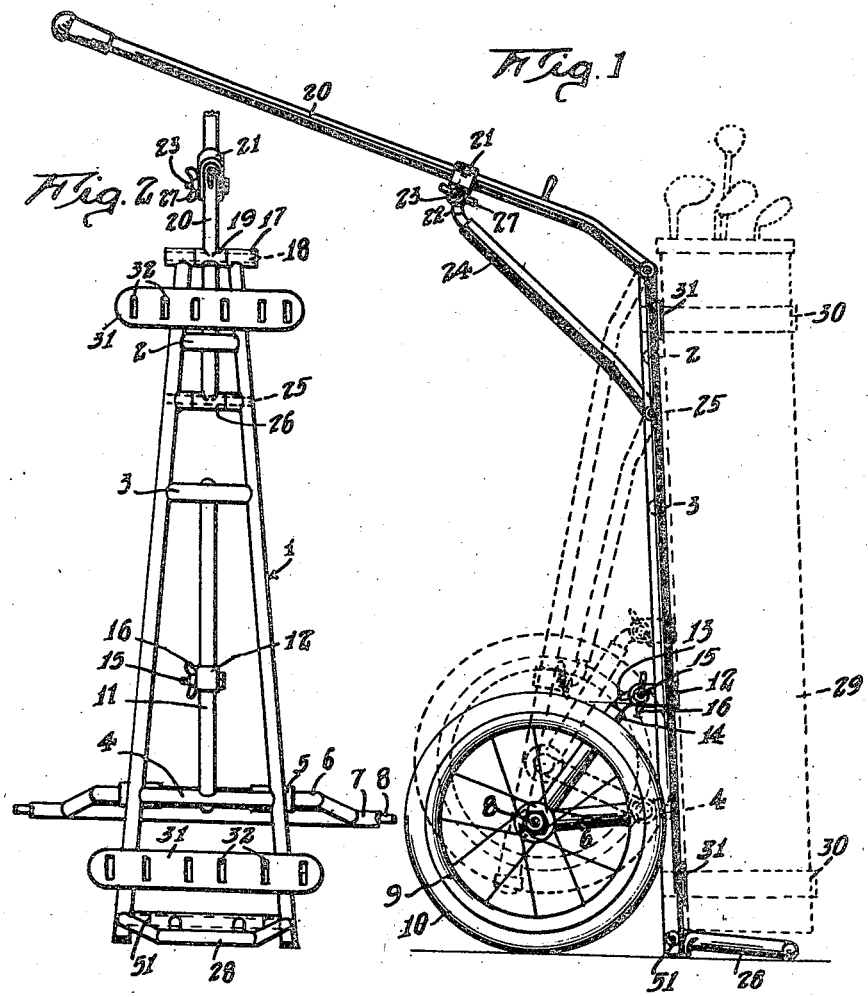

2,415,392

UNITED STATES PATENT OFFICE 2,415,392

CADDY CART

Kenneth L. Morehouse, Los Angeles, Calif.

Application November 17, 1944, Serial No. 563,853

3 Claims. (Cl. 280—41)

My invention relates to caddy carts, and particularly to a caddy cart which is used by a golf player to carry his bag and clubs.

Caddy carts now constructed and in use consist of a framework, a pair of rubber tired wheels upon which the player's bag is strapped. A handle permits the player to push or pull the cart around the golf course. These carts are not flexible or adjustable in any manner for the weight of the bag and clubs. Many golf clubs provide these carts for the players and usually have quite a few on hand, especially at night when the same must be stored. The carts now in use are not flexible and cannot be folded up. They must be stored out of doors as the handle and wheels extend and in their unfolded condition they occupy too much space to store inside. Also a private owner of one of these carts cannot transport the same either in an automobile or on a public conveyance because of their bulky nature.

It is therefore an object of my invention to construct a caddy cart which can be adjusted to compensate and cause the same to balance on its wheels regardless of the weight and size of the bag and clubs.

Another object of my invention is to provide a caddy cart which can be folded up in small dimensions which makes it possible to stack many of these carts together in a small place for storage.

Another object of my invention is to provide a caddy cart which can be cheaply and easily manufactured.

Other objects and advantages of my invention will be found in the accompanying drawing and the preferred embodiments thereof.

In the drawing:

Figure 1 is a side elevation of my caddy cart.

Figure 2 is a fragmentary front elevation.

A caddy cart constructed in accordance with my invention comprises a framework consisting of tubular side frames 1 joined together by tubular cross braces 2, 3 and 4. Journals 5 welded or otherwise attached to the frame 1 carry arms 6 which extend out and are welded to an axle housing 7. The axle 8 is carried by the housing 7 and at its extremities are journaled the wheels 9. I prefer to place rubber tires 10 upon these wheels to make the cart easier to pull and to absorb shocks on uneven ground.

To cause the wheels 9 to fold upwardly and decrease the space necessary for storage, a tubular post 11 connects the cross members 3 and 4 and is either bolted or welded thereto. A split collar 12 slides upon post 11 and has a clevis 13 to which is pivotally connected a tubular arm 14. Tubular arm 14 connects at its opposite end to a collar rotatable on the axle housing 7. A bolt 15 maintains the clevis 13 and the arm 14 together and has on one end a wing nut 16. The axle carrying the wheels 9 can be swung up and down on the arms 6 when the collar 12 is slid up and down the post 11. The wing nut 16 when tightened clamps the split collar 12 on the post 11 bracing the axle housing 7 and wheels 9 in either a folded or extended position.

At the upper end of the frames 1 are bushings 17 carrying a rod 18. Upon this rod 18 is journaled a collar 19 to which is welded the handle 20. To maintain the handle 20 in position I place a collar 21 having a clevis 22 carrying a bolt 23 to fasten the arm 24 on the handle 21. The arm 24 is pivotally connected to the framework by the axle 25 and the collar 26. The bolt 23 has a wing nut 27 which can be tightened up to clamp the collar 21 in any desired position upon the handle 20. When the wing nut 27 is free, the handle can be turned down to lie substantially flat against the axle housing 7. My caddy cart is stored by raising the wheels 9 after wing nut 16 and swinging the same upwardly and inwardly against the frame 1 by sliding the collar 12 upwardly on the post 11 and at the same time freezing the wing nut 27 and folding the handle 20 downwardly against the axle housing 7.

On the lower extremity of the frames 1 is welded a frame 28 which acts as a lower support for a golf bag 29. The golf bag 29 is held on the cart against the frame 1 by passing the straps 30 which have buckles or other fastening devices around the bag 29. The straps 30 run through the slots 32 in the plates 31. These plates 31 are welded to the frames 1.

In balancing my cart, the handle 20 can be positioned at any desirable angle to the frames 1 or the bag 29 by adjusting the position of the collar 21 upon the handle 20, thus adjusting the balancing around the axle 8.

While I have described the preferred embodiments of my invention, I am not limited to any of the details herein set forth except as to the following described claims.

I claim:

1. In an article of the class described, a frame, comprising a pair of side members, held together by horizontal braces, a handle movably attached to the top of said frame, a collar slidable on said handle, an arm pivotally mounted upon said frame and connecting with said collar to support said handle, a wing nut for fixing said collar in any desirable position, a member carried by said frame, a collar slidable on said member, a wing nut for fixing said collar in position on said member, an arm pivotally connected to said frame and carrying an axle housing, an arm connecting said collar and said axle housing, an axle in said housing for attaching wheels.

2. In an article of the class described, a frame, a handle movably attached to said frame, a collar slidable on said handle, an arm pivotally mounted upon said frame connecting with said collar to support said handle, a wing nut for fixing said collar in any desirable position, a member carried by said frame, a collar slidable on said member, a wing nut for fixing said collar in position on said member, an arm pivotally connected to said frame and carrying an axle housing, an arm connecting said collar and said axle housing, an axle in said housing for attaching wheels.

3. In an article of the class described, a frame, a member carried by said frame, a collar slidable on said member, a wing nut for fixing said collar in position on said member, an arm pivotally connected to said frame and carrying an axle housing, an arm connecting said collar and said axle housing, an axle in said housing for attaching wheels.

KENNETH L. MOREHOUSE.

REFERENCES CITED

The following references are of record in the file of this patent:

UNITED STATES PATENTS

| Number | Name | Date |
|---|---|---|
| 634,617 | Hansen | Oct. 10, 1899 |
| 2,359,870 | Moreland | Oct. 10, 1944 |
| 2,210,632 | Perrill | Aug. 6, 1940 |
| 2,335,579 | Chamberlin, et al. | Nov. 30, 1943 |
| 1,409,838 | Emery, et al. | Mar. 14, 1922 |
| 1,554,034 | Richie | Sept. 15, 1925 |
| 1,208,109 | Decker | Dec. 12, 1916 |
| 1,965,943 | Lea | July 10, 1934 |
| 2,031,097 | Bucky | Feb. 18, 1936 |

FOREIGN PATENTS

| Number | Country | Date |
|---|---|---|
| 8,529 | British | 1909 |